(12) United States Patent
Mackenzie

(10) Patent No.: US 7,331,530 B2
(45) Date of Patent: Feb. 19, 2008

(54) METHOD OF OBTAINING AT LEAST A PORTION OF A DOCUMENT

(75) Inventor: Andrew Mackenzie, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 422 days.

(21) Appl. No.: 11/045,376

(22) Filed: Jan. 31, 2005

(65) Prior Publication Data

US 2005/0173514 A1    Aug. 11, 2005

(30) Foreign Application Priority Data

Jan. 30, 2004    (GB)    ................. 0402022.8

(51) Int. Cl.
*G06K 19/06*    (2006.01)
(52) U.S. Cl. ................. 235/494; 235/454; 235/462.11; 235/462.24; 345/179
(58) Field of Classification Search ................. 235/494, 235/454, 462.11, 462.24; 345/179
See application file for complete search history.

(56) References Cited

U.S. PATENT DOCUMENTS

| 6,108,656 A | 8/2000 | Durst |
| 6,663,008 B1 * | 12/2003 | Pettersson et al. .......... 235/494 |
| 2002/0054778 A1 * | 5/2002 | Ericson et al. ................. 400/76 |
| 2003/0011578 A1 * | 1/2003 | Bergovist et al. ........... 345/179 |
| 2003/0033319 A1 | 2/2003 | Van Der |
| 2003/0093384 A1 | 5/2003 | Durst, Jr. et al. |

FOREIGN PATENT DOCUMENTS

| EP | 1 054 335 | 11/2000 |
| EP | 1 058 196 | 12/2000 |
| WO | WO98/51036 A1 | 11/1998 |
| WO | 01/26032 | 4/2001 |
| WO | WO01/26032 A1 | 4/2001 |

OTHER PUBLICATIONS

"Distributing Uniform Resource Locators as Bar Code Images," IBM Technical Disclosure Bulletin, vol. 39, No. 1, p. 167, Jan. 1996.

* cited by examiner

*Primary Examiner*—Michael G. Lee
*Assistant Examiner*—Kristy A. Haupt

(57) ABSTRACT

A method of providing a copy of at least a portion of a document (2) comprising providing the document (2) with at least one document identifying indicia identifying at least a portion of the document, comprising the following steps, providing an indicia reader (8) to read the indicia on the document, reading the indicia with the indicia reader (8) and generating indicia data representative of the indicia, identifying the document (2), and/or portion thereof, from the indicia data generated by reading the indicia; and obtaining an electronic copy of the document and/or portions thereof identified by the indicia data.

26 Claims, 5 Drawing Sheets

METHOD OF OBTAINING AT LEAST A PORTION OF A DOCUMENT

FIELD OF THE INVENTION

This invention relates to a method of obtaining at least a portion of a document and related apparatus. Particularly, but not exclusively, the method provides a method of using a digital pen to obtain an electronic copy of a document or at least a portion of the document.

BACKGROUND OF THE INVENTION

It is often desired to obtain a copy of a printed, or otherwise manufactured, document (hereinafter referred to as a printed document). Photocopiers, scanners, cameras, etc. are well known devices for producing copies of such printed documents. However with such devices the quality of the copied document is dependent upon the quality of the original. If the original is damaged and/or incomplete then the quality of the copied document will be affected.

The advent of the networks such as office Intranets and the Internet, and in particular the World Wide Web (often referred to as the Web), has made it easy to get hold of electronic versions of documents once a source of that document has been established. A user will generally require a so-called link or an address from which an electronic version may be obtained. If the user simply has a printed document of which they wish to obtain a copy then it is time consuming, if not impossible, to try and locate a new copy.

SUMMARY OF THE INVENTION

According to a first aspect of the invention there is provided a method of providing an electronic copy of at least a portion of a document comprising providing at least one document identifying indicia, capable of identifying at least a portion of said document, on said document said method further comprising the following steps:
  i. providing an indicia reader capable of reading said at least one indicia on said document;
  ii. providing indicia data generation means arranged to receive data from said indicia reader and generate indicia data representative of said indicia;
  iii. reading said indicia with said indicia reader, providing said data to said indicia generation means and generating indicia data representative of said indicia with said indicia data generation means;
  iv. providing document identification means capable of identifying at least a portion of said document from said indicia data;
  v. identifying at least a portion of said document with said document identification means; and
  vi. providing a document retrieval means arranged to obtain said document;
  vii. obtaining an electronic copy of said document and/or portions thereof identified using said document retrieval means.

An advantage of such a method is that it is much more convenient than prior art methods at obtaining a copy of a tangible document. Such a method provides the technical advantage of reducing the need for copying means (such as photocopiers) and may increase the utilisation of other resources such as printers and the like. A further technical advantage is that the quality of a copy of the document that a user may be able to obtain is likely to be of a higher quality compared to prior art copying mechanisms.

Further, the method may reduce paper consumption since a user can obtain an electronic copy of a document which he/she may or may not decide to print and the method may also provide an editable document.

The method may also allow a user to obtain a portion of the document rather than the complete document as will be described herein.

According to a second aspect of the invention there is provided a system arranged to provide an electronic copy of at least a portion of a document, said system comprising an indicia reader, a document store and a document identification means, said indicia reader being capable of reading data, generating data and of connection to said document identification means, and being arranged to read document identifying indicia from a document and generate indicia data representative of said indicia, said system further comprising a document identification means capable of receiving and processing data, said document identification means being arranged to receive said indicia data and to process said indicia data to identify said document and said document store being capable of storing data and of supplying identified data and being arranged to supply at least a portion of an electronic copy of said document identified by said document identification means.

An advantage of such a system is that it allows a user to obtain a copy of a document by using his/her indicia reader on the document. In some embodiments the indicia reader comprises a digital pen and such a system may prove convenient and simple for a user to use. In other embodiments the indicia reader comprises a PDA, a telephone, a camera (generally digital), a scanner, a printer or any other such means.

According to a third aspect of the invention there is provided a method of providing an electronic copy of at least a portion of a document comprising providing at least one document identifying indicia, capable of identifying at least a portion of said document, on said document the method further comprising the following steps:
  i. providing an indicia reader arranged to read said at least one indicia on said document;
  ii. providing an indicia data generator arranged to receive data indicia reader and generate indicia data representative of said indicia;
  iii. reading said indicia with said indicia reader, providing said indicia data to said indicia data generator, and generating indicia data representative of said indicia with said indicia data generator;
  iv. providing a document identifier arranged to identify at least a portion of said document from said indicia data;
  v. identifying at least a portion of said document with said document identifier; and
  vi. providing a document retriever arranged to receive the identity of at least a portion of said document from said document identifier and to obtain at least a portion of an electronic copy of a document;
  vii. obtaining an electronic copy of said document and/or portions thereof identified using said document retriever.

According to a fourth aspect of the invention there is provided a system arranged to provide an electronic copy of at least a portion of a document, said system comprising an indicia reader, a document store and a document identifier, said indicia reader being capable of reading data, generating data and of connection to said document identifier, and being arranged to read document identifying indicia from a document and generate indicia data representative of said indicia, said system further comprising a document identifier capable of receiving and processing data, said document identifier being arranged to receive said indicia data and to process said indicia data to identify said document and said document store being capable of storing data and of supplying identified data and being arranged to supply at least a portion of an electronic copy of said document identified by said document identifier.

In a first preferred embodiment there is provided an indicia reader arranged to read document identifying indicia provided on a document, the indicia reader being capable of establishing a connection with a processing device and of generating indicia data representative of a document identifying indicia by reading document identifying indicia on a document, the indicia reader being further arranged to transmit the indicia data via a connection established with a processing device.

According to a second preferred embodiment of the invention there is provided a computer arranged to establish a connection with an indicia reader and receive indicia data and/or a request for a copy of a document from an indicia reader, the computer being further arranged to obtain an electronic copy of the document identified by the indicia data.

The computer and the indicia reader may be provided by separate devices. For example, the indicia reader may comprise a digital pen which establishes a connection with a computer. In an alternative, or additional, embodiment the computer and the indicia reader may be provided by components within the same device. For example, the indicia reader may comprise a camera (or other image capture device) that is provided by a PDA, or the like, and the computer may be provided by the PDA.

According to a third preferred embodiment of the invention there is provided a computer readable medium containing instructions which when read by a computing device cause that device to perform at least a portion of the first aspect of the invention.

According to a fourth preferred embodiment of the invention there is provided a computer readable medium containing instructions which when read by a computing device cause that device to perform as at least a portion of the system of the second aspect of the invention.

According to a fifth preferred embodiment of the invention there is provided a computer readable medium containing instructions which when read by an indicia reader cause that indicia reader to perform as the indicia reader of the first preferred embodiment of the invention.

According to sixth preferred embodiment of the invention there is provided a computer readable medium containing instructions which when read by a computer cause that computer to function as the computer of the second preferred embodiment of the invention.

The machine readable medium of any of the aspects of the invention may be any one or more of the following: a floppy disk; a CDROM/RAM; a DVD ROM/RAM (including +R/RW, −R/RW); any form of magneto optical disk; a hard drive; a memory; a transmitted signal (including an internet download, file transfer, or the like); a wire; or any other form of medium.

BRIEF DESCRIPTION OF THE DRAWINGS

There now follows by way of example only a detailed description of the present invention with reference to the accompanying drawings in which.

DETAILED DESCRIPTION OF THE DRAWINGS

Figure 1:
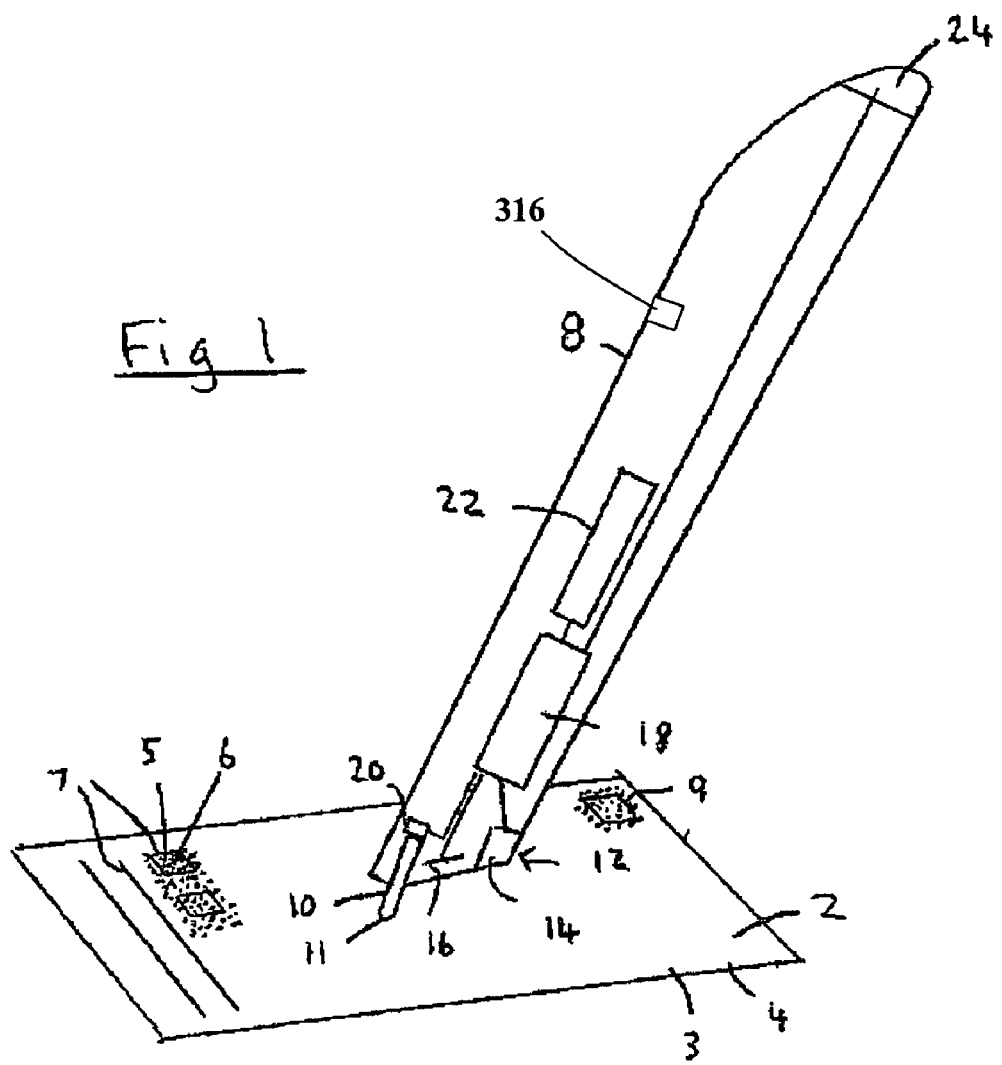
FIG. 1 shows a document according to an embodiment of the invention and a digital pen according to an embodiment of the invention.

Referring to FIG. 1, there is provided a document 2 according to the invention for use in a digital pen and paper system which comprises a carrier 3 in the form of a single sheet of paper 4 with position identifying markings 5 printed on at least some parts of it. The markings 5, which are not shown to scale in FIG. 1, form a position-identifying pattern 6 on the document 2 which provides a document identifying indicia as will be explained hereinafter. Also printed on the paper 4 are further markings 7 which are clearly visible to a human user of the document, and which make up the human visible content of the document 2. The content 7 is in the form of a number of lines and text and graphic features which extend over, and are therefore superimposed upon, the pattern 6. The skilled person will appreciate that method would work on any substrate, other than and including paper, on which the position identifying markings 5 may be provided.

The digital pen 8 provides a document identifying indicia reader. The pen 8 comprises a writing nib 10, and a camera 12 made up of an infrared (IR) LED 14 and a CMOS sensor 16. The camera 12 is arranged to image a circular area adjacent to the tip 11 of the pen nib 10. A processor 18 processes images from the camera 12 taken at a predetermined rapid sample rate. A pressure sensor 20 detects when the nib 10 is in contact with the document 2 and triggers operation of the camera 12. Whenever the pen is being used on an area of the document 2 having the pattern 6 on it, the processor 18 can determine from the pattern 6 the position of the nib 10 of the pen whenever it is in contact with the document 2. From this it can determine the position and shape of any marks made on the patterned areas of the document 2. This information is stored in a memory 22 in the pen as it is being used as pen stroke data. This pen stroke data may be thought of as indicia data; i.e. data that is representative of the indicia that has been read by the pen 8. When the user has finished marking the document 2, this is recorded in a document completion process, for example by making a mark with the pen 8 in a send box 9. The pen is arranged to recognise the pattern in the send box 9 and send the pen stroke data to a pen stroke interpretation system in a suitable manner, for example via a radio transceiver 24 which provides a Bluetooth™ radio link with an internet connected PC. Suitable pens 8 are available from Logitech under the trade mark Logitech Io and Nokia™ which sells a "digital pen".

In other embodiments the indicia reader may not be a digital pen and may comprise any of the following non-exhaustive list: a PDA (Personal Digital Assistant); a camera (generally digital); a scanner; a printer having an input means such as bar code reader, CMOS sensor, or the like; or any other suitable device. The indicia reader may not rely on IR to read the document identifying indicia and may instead rely on any other suitable media. For example any of the following non-exhaustive list of media may be suitable: UV light; visible light; x-ray; radio waves, any other electromagnetic radiation.

Figure 2:
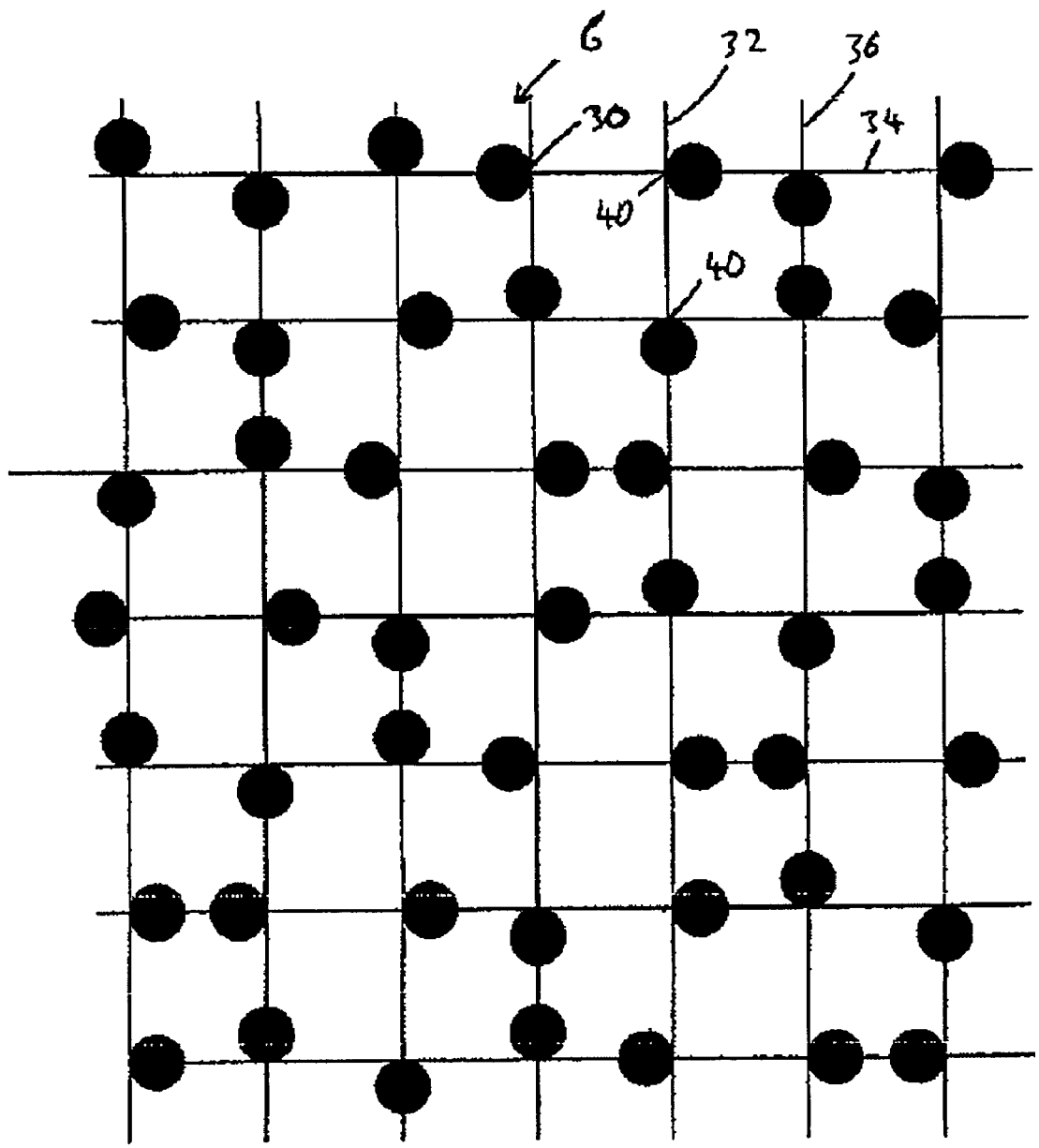
FIG. 2 shows a part of a position-identifying pattern on the document of FIG. 1.

Referring to FIG. 2, the position-identifying pattern 6 is made up of a number of graphical elements comprising black ink dots 30 arranged on an imaginary grid 32. The grid 32, which is shown in FIG. 2 for clarity but is not actually marked on the document 2, can be considered as being made up of horizontal and vertical lines 34, 36 defining a number of intersections 40 where they cross. The intersections 40 are of the order of 0.3 mm apart, and the dots 30 are of the order of 100 μm across. One dot 30 is provided at each intersection 40, but offset slightly in one of four possible directions up, down, left or right, from the actual intersection 40. The dot offsets are arranged to vary in a systematic way so that any group of a sufficient number of dots 30, for example any group of 36 dots arranged in a six by six square, will be unique within a very large area of the pattern. This large area is defined as a total imaginary pattern space, and only a small part of the pattern space is taken up by the pattern on the document 2. By allocating a known area of the pattern space to the document 2, for example by means of a co-ordinate reference, the document and any position on the patterned parts of it can be identified from the pattern printed on it. An example of this type of pattern is described in WO 01/26033.

Figure 3:
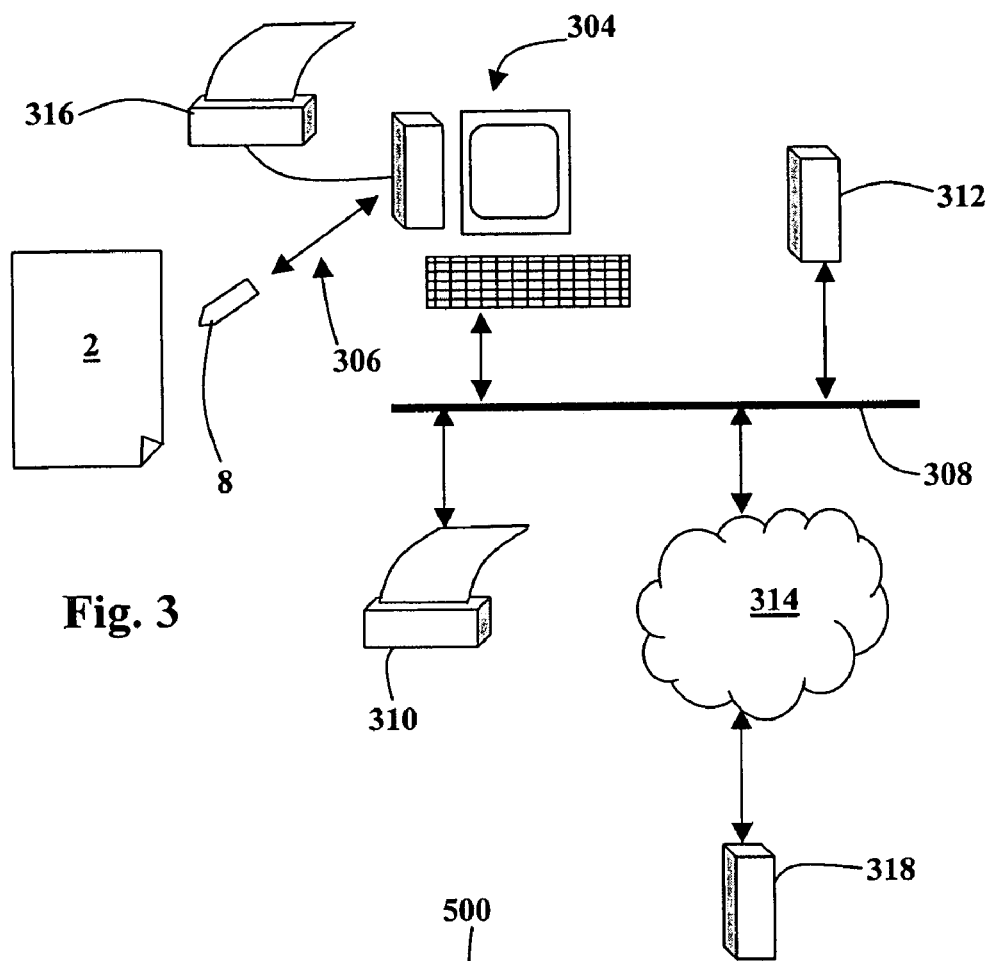
FIG. 3 shows an embodiment of a system for obtaining a copy of a document.

FIG. 3 shows a digital pen 8 adjacent a document 2 and connected to a computer 304 via a wireless connection 306. The computer 304 is connected to a network 308. The network 308 is also connected to a printer 310, a server 312 and a global network 304, such as the Internet. The computer 304 is also connected to what is generally termed in the art as a local printer 316 (i.e. a printer that is connected directly to a port of the computer 304).

The skilled person will appreciate that the global network 314 allows devices, such as a server 318, to be accessed from the network 308 including the computer 304.

In the embodiment shown the computer 304 is what is commonly referred to as a desktop PC; a computer that originally conformed to the IBM™ specification but which now commonly refers to a computer being compatible with the Intel™ X86 instruction set. It will be appreciated that the computer could equally comprise any other architecture of computer or indeed could comprise a machine that was not a recognised architecture. The computer may for example comprise any of the following architectures: an Apple™ PowerPC™ or other Apple™ computer, a RISC (Reduced Instruction Set Computer) machine or the like.

The network 308 is commonly referred to as an Ethernet network covered by the IEEE 802.3 standard but the skilled person will appreciate that any other network protocol may be used. The network may for example be a token ring network or may be a wireless network such as a WIFI (WIreless FIdelity as defined by the IEEE 802.11 standard), HomeRF or HiperLAN.

In the embodiment being described the pen 8 is connected to the computer 8 with a wireless connection 306. This wireless connection 306 may conveniently be provided by a Bluetooth™ connection. Other wireless protocols may also be suitable including any of the following: WIFI (WIreless FIdelity as defined by the IEEE 802.11 standard), HomeRF or HiperLAN. The skilled person will appreciate that in other embodiments a wired connection may be suitable to connect the pen 8 to the computer 304. In such embodiment the connection may be provided by means such as a USB (Universal Serial Bus) or Firewire™ (IEEE 1394) connections or the like. Connection is intended to cover any connection allowing data to be passed between the pen 8 and the computer 304.

Figure 5:
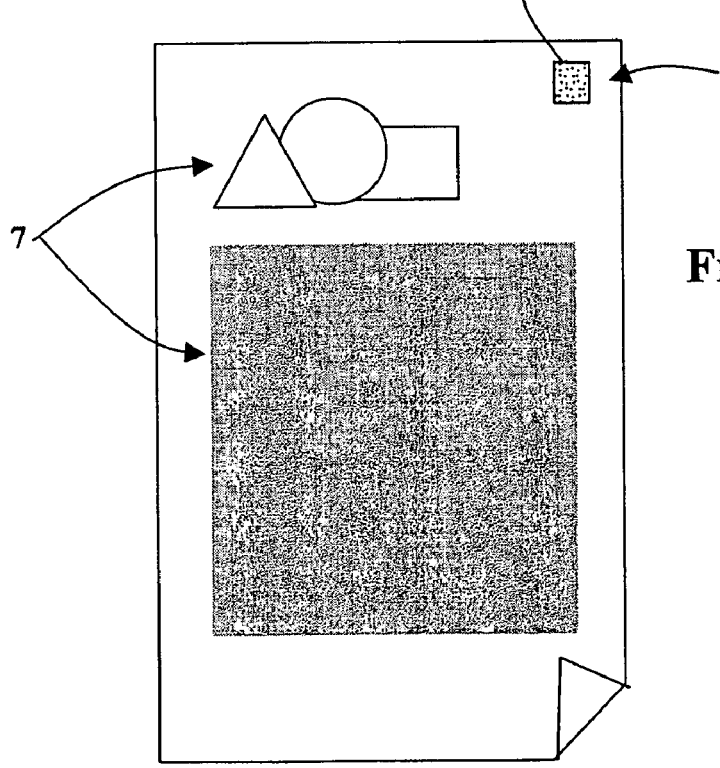
FIG. 5 shows a document suitable for use in the system of FIGS. 3 and 4.

As described in relation to FIG. 1 and can be seen in more detail in FIG. 5 the document 2 comprises portions of content 7 and also portions of position identifying pattern 6. Although the examples of FIGS. 1 and 5 are shown with only relatively small areas of position identifying pattern 6, when compared to the overall size of the document, the skilled person will appreciate that this does not need to be the case. It is possible for much larger portions of position identifying pattern 6 to be provided and indeed the entire, or substantially the entire, document may be covered with position identifying pattern 6. Portions of the document may be associated with portions of position identifying pattern 6 such that a sub-portion of a document may be referenced by the associated position identifying pattern 6.

Figure 4:
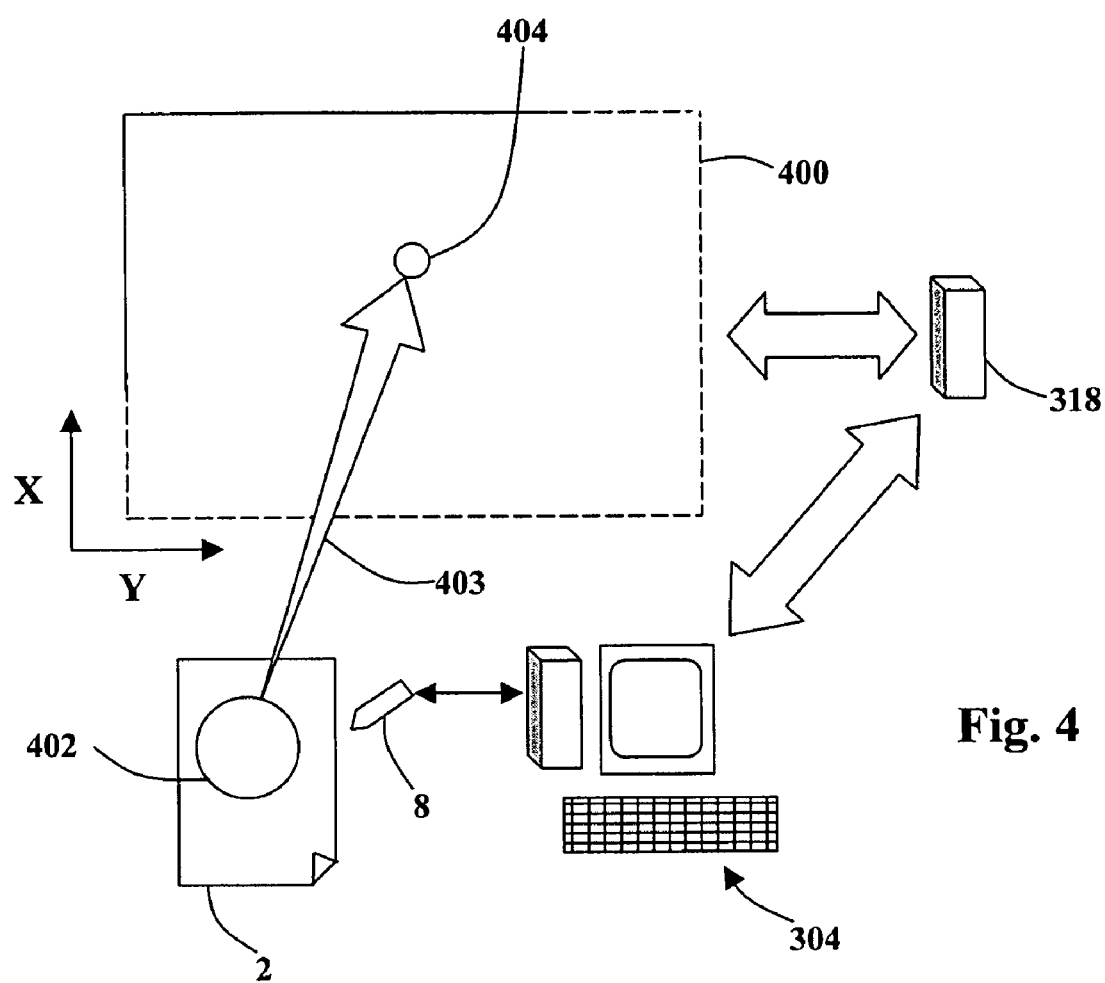
FIG. 4 shows a further view to the embodiment of FIG. 3.

As shown in the example shown in FIGS. 3 and 4 when the pen 8 is used on the document 2 the pen 8 stores the pen stroke data which is sent to the computer 304. The pen stroke data identifies where in the imaginary pattern space 400 the pen has been positioned. (This identification may be by determining the co-ordinates of the location in the pattern space or the like.) It will be appreciated that for reasons of scale only a portion of the pattern space 400 is shown in FIG. 4. As represented by the arrow 403 in FIG. 4 a portion 402 of position identifying pattern 6 on the document 2 is mapped to a portion 404 of the pattern space 400. How the position identifying pattern 6 is mapped to a document 2 is recorded and held on devices such as a document registry server.

The computer 304 forwards the pen stroke data that it has received to the server 318. The server 318 provides the pen stroke interpretation system that allows the pen stroke data to be interpreted. As discussed, the pen has determined position in pattern space 400 and the pen stroke interpretation system determines the meaning of the strokes made by the pen 8. To identify the document 2, or indeed portion of the document 2, from which the pen stroke data has been generated a document registry server may be accessed.

Therefore the system also comprises a document registry server which in the embodiment being described is provided by the server 312. Once the pen stroke data has been interpreted by the pen stroke interpretation system the identity of the document is determined and the document registry server performs this. The result of the pen stroke interpretation performed by the pen stroke interpretation system is provided to the document registry server which returns the identity of the document; the pen stroke registry server maintains a record of what position-identifying pattern 6 has been provided to what document, or portion of a document 2. In the current embodiment the document registry server and the pen stroke interpretation system are shown as being provided by different servers 312,318. The skilled person will appreciate that this need not be the case and the same server or other processing device could provide the two functions. The term processing device is intended to cover any device that is capable of performing processing of data. Examples of processing devices include but are not limited to the following examples: a computer, a server, a digital pen, a printer, a hub and/or switch, PDA, camera, telephone, and the like.

In other embodiments the pen stroke interpretation system 318 and/or the document registry server 312 may be provided by any other suitable means. For example the server 312 on the network 308 and/or the computer 304 may each be able to provide the pen stroke interpretation system and/or the document registry server. Any suitable processing device or combination of processing devices that the pen 8 can access via the computer 304 and the networks 308 and 314 may provide the pen stroke interpretation system and/or the document registry server. Indeed, the pen 8 may provide the pen stroke interpretation system and/or the document registry server.

Thus, the combination of the pen stroke interpretation server (the server 318) and the document registry server (the server 312) is able to return the identity of the document, or portion thereof, on which the pen 8 is writing by interpreting the pen stroke data provided by the pen 8.

The electronic copy of the document 2 may be stored anywhere that is able to have a data connection established thereto and which is accessible remotely. The location at which the electronic copy of the document is stored may be thought of as a document store.

Embodiments of the present invention allow an electronic copy of the document 2 to be obtained using the document 2 as a reference to its own content. Indeed, it is possible for embodiments of the invention to provide portions of a document rather than the entire document. It will be appreciated that a portion of the position-identifying pattern 6 could be associated with a part of a document rather than the entire document 2; using position-identifying pattern 6 on the printed page, the document may be resolved to the any of the following non-exhaustive list: section; page; paragraph; line; word; letter and/or figure; element level. Obtaining a copy of the document and/or portion thereof may be achieved in different ways as will be expanded upon below.

Figure 6:
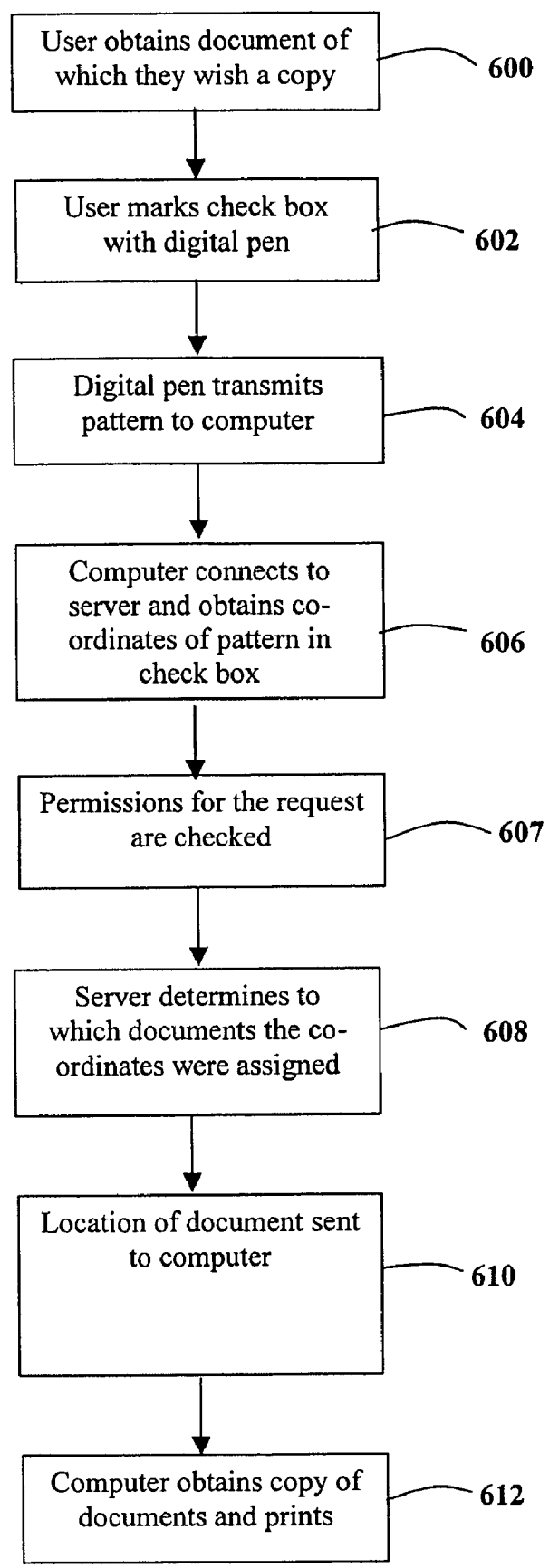
FIG. 6 shows a flow chart outlining the method steps for an embodiment of the present invention.

In one embodiment, as exemplified by FIG. 5 and described in relation to FIG. 6, a document is provided with a check-box 500 which has been assigned a portion of position identifying pattern 6 (i.e. an area of position identifying pattern). First a user obtains a copy of the document 2—step 600. The pen 8 is arranged such that when a user writes in the check-box 500 the camera 12 sees the portion of position identifying pattern 6 and determines that a user wishes to obtain a copy of the document 2 (Step 602).

The pen 8 is arranged to communicate the fact that the user wishes to obtain a copy of the document 2 to the computer 304 (step 604). The computer 304 is arranged to obtain the identity of the document 2 on which the pen 8 is writing by communicating with the pen stroke interpretation system (server 318) and document registry server (server 312) (step 606). Permissions associated with the electronic document, or portion thereof if less than the whole document has been requested, are checked in step 607 to ascertain whether the user of the pen 8 is entitled to obtain the copy he/she has requested. Once the pen stroke interpretation system has received the pen stroke data it determines from the document registry server the document identity (step 608) (assuming that the request met the permission check performed in step 607) and returns the identity and/or location of the electronic version of the document 2 to the computer 304 (step 610).

The computer 304 is further arranged to obtain a copy of the document and print it at a printer 310,316 (step 612). In this embodiment the server 318 is arranged to return the location at which the electronic version of the document 2 is stored when it returns the identity of the document 2. The electronic version of the document 2 may of course be stored anywhere on a network to which the computer 304 has access, including a hard-drive within the computer 304, the network 308 or on the Internet 314. It will be appreciated that if the printer on which a document 2 is printed is a colour printer, as is common in the art, a user will be able to obtain a colour copy of the document 2; this may provide greater user convenience than photocopiers which are generally black and white only. Indeed, a user may be able to obtain a colour copy of the document 2 even if they have a monochrome version initially. The electronic version may be provided in an editable format allowing a user to tailor the electronic version as he/she desires. The electronic version may be provided in a non-editable format so it is harder for a user to change the contents. A user may still be able to change the orientation of how the document prints, etc.

Those familiar with the position-identifying pattern provided by Anoto™ of Scheelevägen 15, S-223 70 Lund, Sweden will appreciate that documents provided by Anoto™ have a "send" box associated with them as described above. In such documents the pen 8 does not send information to the computer 304 until a user of the pen 8 marks the send box. At this point the pen sends the pen stroke data to the computer 304. Thus, a connection between the pen 8 and the computer 304 may be established at a time later than the pen stroke data is generated by the pen 8 and may be when the "send" box is checked.

In another embodiment of the invention, an embodiment in which a "send" box has been provided on the document 2, the document 2 is provided with a check box which a user can mark to obtain a copy of the document. The check-box provides an area of document identifying indicia. However, in this embodiment a copy is not obtained until the send box is marked because no data is sent from the pen 2 to the computer 304 until that time. Once data has been sent to the computer 304 the computer 304 is arranged to determine whether or not the check box requesting a copy of the document has been marked by processing the pen stroke data that it receives (i.e. acts as a pen stroke interpretation system). If this check box has been marked then the computer 304 is arranged to contact the document registry server (provided by the server 312) and obtain the identity of the document 2, obtain an electronic copy of the document and print a copy of the document 2.

The pen 8 may continuously stream pen stroke data to the computer 304 allowing the computer 304 to process the pen stroke data in real time and/or store the pen stroke data for subsequent processing. Use of such continuous streaming may enable functionality such as browsing (much like a user browses the World Wide Web) wherein electronic documents are obtained according to the action of the pen 8.

In yet another embodiment the computer 304 is arranged such that there is an input mechanism allowing a user to request a copy of a document on which the pen 8 connected to the computer 304 has been used/or is being used. Variations on this embodiment will now be described.

In one embodiment the input mechanism comprises a so-called keyboard short cut; the computer 304 is arranged to detect a predetermined combination of key presses and perform an action if that combination is detected. In this embodiment the computer 304 is arranged such that when the keyboard short cut is detected the computer 304 contacts the document registry server i.e. the server 312 and obtains the identity of the document for which the pen 8 has most recently sent pen stroke data. Once the identity of the document 2 has been obtained the computer 304 accesses an electronic copy of the document 2 and prints a copy on printer 310,316.

The skilled person will appreciate that in embodiments in which the document is provided with a portion of Anoto™ pattern as a document identifying indicia then a small area of pattern in needed to resolve the location within the overall pattern space (which is on the order of a few mm square) can be uniquely identified. The pen stroke interpretation system 318/document registry server 312 combination is able to ascertain to what document such a uniquely identified 6×6 grid was allocated to and therefore provide the identity of the document from which it came. Thus, it is possible for a copy of a document to be retrieved from fragments, perhaps small fragments, of a document and a user will not need a complete document in order to obtain a copy. This is a possible advantage of embodiments of this invention; a copy of a document can be obtained from a printer 310, 316 although only fragments of it are available.

In other embodiments the input mechanism may comprise an option within a software package running on the computer 304. For example a software package may be provided that processes pen stroke data received from the pen 8. Such a software package may be provided with the facility for a user to obtain a copy of the document from which the pen stroke data originated. If the option within the software is activated (such as by a check-box, button, menu option, or the like) then the computer 304 is arranged to contact the pen stroke interpretation system 318/document registry server 312 such the identity of the document 2 identified. The computer 304 can then obtain an electronic copy of the document 2 and print it as desired on a printer 310, 316.

The embodiments so far described have relied upon the computer 304 communicating with the pen stroke interpretation system/document registry server to resolve the identity of the document 2. It will be appreciated that this need not be the case and it would be possible for the pen 8 to communicate directly with the pen stroke interpretation system (e.g. the server 318)/document registry server 312 in order to obtain the identity of the document 2. In such an embodiment the pen 8 is arranged to resolve the identity of the document 2, send the identity of the document 2 to the computer 304 which is arranged to obtain an electronic copy of the document for printing if desired.

Embodiments of this invention may allow a plurality of people to obtain a copy of the same document 2. For example, a document may be passed around a group of people, perhaps in a meeting, who each use his/her own pen 8 on the document. Use of the pen 8 on the document 2 would allow that person to obtain a copy of the document through any of the mechanisms described herein. The pen 8 may be arranged to store data in the memory 22 thereof which is downloaded to a computer 304 when the user returns to his/her computer 304. Thus, a user may mark one or more documents 2 with his/her pen 8 and obtain copies of each of the documents, as desired, at a later time.

In yet a further embodiment the pen 8/computer 304 system may be arranged to allow a user thereof to send, perhaps by email, fax., or the like a copy of the document 2. Once the identity of the document 2, or part thereof, has been ascertained by any of the mechanisms described herein software provided on the computer 304 may request one or more email addresses/fax. numbers or the like to which the electronic version of the document 2 should be sent.

It will be appreciated that in all of the embodiments described it is not essential that the electronic version of the document be printed. A user of the computer 304 may simply wish to have and/or view an electronic version of the document 2.

Although the embodiments so far described have made reference to Anoto™ pattern as the document identifying indicia it will be appreciated that this is only one embodiment and other indicia are possible. Examples of other document identifying indicia include bar codes; Xerox dataglyph, 2D bar-codes, or any other suitable indicia.

If a pattern other than the Anoto™ pattern in used then the indicia reader provided will be a reader capable of reading the document identifying indicia used. For example if the document identifying indicia were a bar code then the indicia reader would be a bar code reader.

Each digital pen 8 is likely to have its own unique identification number which may be thought of as a code. Such a unique identification number (code) may allow some embodiments of the invention to increase the security of an electronic version of the document 2. For example, each electronic version of the document 2, as it is stored, may have a list of pen identification numbers (i.e. predetermined codes) associated therewith by which the electronic version of the document may be requested. If a copy of the document 2 is requested by a pen 8 other than those listed the request may not be fulfilled. In such embodiments the identification number of the pen 8 may be sent along with the pen stroke data for a copy of the document 2. The identification number may be thought of providing the identity of the user of the pen 8 should the pen always be used by the same person. Means of identifying the user other than the identification code of the pen 8 may also be used. For example, a user may supply a password, PIN, or the like and each of these may be thought of as a code.

In other embodiments the creator of a document may be sent a communication, such as by email, when a request for a document is made. The creator may then allow or disallow the document to be copied by an appropriate response to that email. As with other electronic documents it is possible that the electronic version of the document 2 is password protected such that even though a copy has been obtained, it cannot be opened or printed without the appropriate password.

In some embodiments a password, or other access control, may be required to allow a user to access a digital pen 8 from the computer 304. This aims to increase the security of the pen 8/computer 304 system. Thus, even though a user lose his/her pen it may not be possible for the finder of a pen 8 to use it (and thus obtain copies of documents thereon using embodiments of this invention) without the password that is required to allow access to the pen 8 from a computer 304.

The skilled person will appreciate mechanisms that allow the computer 304 and/or the pen 8 to obtain an electronic copy of the document 2 once its identity is known. In one embodiment the server 312 acting as the document registry server is arranged to return a URL (Uniform Resource Locator) identifying the electronic copy of the document 2 and providing a location for it that allows the electronic copy to be accessed.

In a further embodiment the pen 8 may be fitted with a button, switch, or other input mechanism 26 that allows a user to request a copy of the document 2 on which has written. Activation of the input mechanism on the pen 8 may send pen stroke data to the computer 304 or may store the fact that a copy has been requested so it is transmitted to the computer 304 along with other pen stroke data. Thus, a user may be able to work on a number of documents with the pen stroke data generated by this work being stored in the memory 22. The user may use the input mechanism 26 in relation to any of the documents such that when the pen stroke data is sent to the computer 304 a copy of the document 2 is obtained as described above. Marking a number of documents in this manner and obtaining copies of a plurality of documents may be applicable to any of the other embodiments described herein.

In a further embodiment a user may be able to obtain a copy of a document 2 by writing a predetermined phrase over an area of position-identifying pattern 6 using the pen 8. The predetermined phrase may for example be the word "copy". Thus, the pen stroke data would comprise the word "copy" and the computer 304 may recognise this and obtain a copy of the document 2 when it receives the pen stroke data. Thus a user may again work on a number of documents and obtain a copy of any of those documents.

In embodiments that allow a user to select a portion of a document at a time a user may be able to use the pen 8 to mark the portion of the document of which he/she wishes a copy. Marking of the portion of the document 2 may be by way of any of the following non-exhaustive list: circling; underlining, ticking a related check-box, or the like. As discussed above, the user may be able to obtain portions of the document which may comprise any of the following non-exhaustive list: sections; pages; paragraphs; lines; words; letters and/or figures; element level. Thus, a user may be able to obtain a copy of a word by appropriate use of the pen 8 much like a user of a GUI (Graphical User Interface) can copy words within a document to a memory space often referred to as a clipboard.

In some embodiments the pen 8 may be provided with a docking station allowing it to be connected to the computer 304, or other processing device. It may for instance be desirable to connect the pen 8 to a processing device such as a printer to allow the electronic copy of the document 2, or portion thereof, to be printed.

Embodiments may be arranged to assess the pen stroke data stored in the pen 8 and determine whether a user of the pen 8 has specified that a copy of a document or portion thereof should be obtained. If such assessment determines that an electronic copy has been requested then the copy may be obtained without further user intervention.

The embodiments discussed above describe that an indicia reader reads a document identifying indicia on a document. Some embodiments of the invention may be used to try and prevent further copies of a document being made. For example, and as discussed herein a document is provided with a document identifying indicia. Should electronic copies of that document, or portions thereof, be obtained using any of the embodiments described herein then indicia within the electronic copy may be omitted or otherwise modified. Such alteration of the document identifying indicia in the electronic copies may allow different permissions to be set for the electronic copies when compared to the document 2. This may prevent copies being made from prints of the electronic copies. Omitting the document identifying indicia from the electronic copies may also prevent further copies being made using embodiments of this invention.

A user may be able to indicate by marking, perhaps by writing on using the pen 8, the document 2 to where he/she wishes to have the document printed. When the pen stroke data is assessed an electronic copy of the document 2 may be obtained and printed to the printer that is specified by the pen stroke data. Indeed, the user may be able to indicate other criteria by marking the document 2 using the pen 8. For example, the user may be able to specify any of the following non-exhaustive list: the format of the electronic copy that he/she requires; the quality of the data in the electronic copy; where the electronic copy should be saved; whether the electronic copy should be printed or not; which application should be used to open the electronic copy; or the like. This may be thought of as modifying the indicia data to tailor the electronic copy of the document to a user's preference.

Reference is made throughout this document to the pen 8. Use of this term has been made for ease of reference and the skilled person will appreciate that many embodiments described could equally well be applied to other indicia readers such as those described elsewhere.

The invention claimed is:

1. A method of providing an electronic copy of at least a portion of a document comprising providing on said document at least one document identifying indicia, capable of identifying at least a portion of said document, said method comprising the following steps:
   i. providing an indicia reader capable of reading said at least one indicia on said document;
   ii. providing indicia data generation means arranged to receive data from said indicia reader and generate indicia data representative of said indicia;
   iii. reading said indicia with said indicia reader, providing said data to said indicia generation data means and generating indicia data representative of said indicia with said indicia data generation means;
   iv. providing document identification means capable of identifying at least a portion of said document from said indicia data;
   vii. identifying at least a portion of said document with said document identification means;
   viii. providing a document retrieval means arranged to obtain said document; and
   vii. obtaining an electronic copy of said document and/or portions thereof identified using said document retrieval means,
   wherein said indicia reader is capable of allowing a user to modify indicia data provided on said document.

2. A method according to claim 1 in which said steps are performed in the order presented.

3. A method according to claim 1 in which said document identifying indicia comprises a portion of a pattern wherein the portion of the pattern is a position identifying pattern.

4. A method according to claim 1 in which said indicia reader is a digital pen capable of identifying a document by reading a portion of pattern wherein the portion of the pattern is a position identifying pattern.

5. A method according to claim 1 in which said document identification means is capable of identifying a document from a fragment of said document containing document identifying indicia.

6. A method according to claim 1 in which said indicia reader is capable of generating data and transmitting data, the method comprising said reader generating and transmitting a request for a document to said document retrieval means and said document retrieval means obtaining a copy of said document in response to a request from an indicia reader if said request comprises a code which corresponds to a predetermined code.

7. A method according to claim 6 in which said indicia reader is capable of having data associated therewith, and in which said code comprises an identification number comprising data associated with said indicia reader.

8. A method according to claim 1 which comprises setting permissions for documents in said document store, said permissions being arranged to restrict access to electronic copies of said document.

9. A method according to claim 8 in which said permissions are further arranged to implement rights management for said electronic copy of said document.

10. A method according to claim 1 in which said indicia reader is capable of generating data, the method comprising providing said document with an area of document identifying indicia arranged to cause said indicia reader to generate data comprising a request for a copy of said document, the method comprising generating a request when said area is read by said reader.

11. A method according to claim 1 which comprises providing a printer capable of printing an identified document, the method comprising causing said document to be printed on said printer.

12. A method according to claim 11 wherein said printed copy is of higher quality than said document.

13. A method according to claim 1 which comprises an indicia modifying means capable of modifying document identifying indicia and arranged to modify said document identifying indicia within said electronic copy of said document.

14. A method according to claim 1, the method further comprising modifying said indicia data to specify tailoring of said electronic copy of said document.

15. A method according to claim 1 in which said indicia reader is capable of marking said document, the method comprising using said indicia reader to mark said document to identify a portion of said document and obtaining an electronic copy of that portion of said document.

16. A method according to claim 1 in which the document identifying indicia exists in an area of position identifying pattern, wherein the area of position identifying pattern covers the entirety of the document.

17. A system arranged to provide an electronic copy of at least a portion of a document, said system comprising an indicia reader, a document store and a document identification means, said indicia reader being capable of reading data, generating data and of connection to said document identification means, and being arranged to read document identifying indicia from a document and generate indicia data representative of said indicia, said system further comprising a document identification means capable of receiving and processing data, said document identification means being arranged to receive said indicia data and to process said indicia data to identify said document and said document store being capable of storing data and of supplying identified data and being arranged to supply at least a portion of an electronic copy of said document identified by said document identification means, wherein said indicia reader is capable of allowing a user to modify indicia data from said document.

18. A system according to claim 17 in which said system comprises a document registry server capable of maintaining data and arranged to maintain a record of which document identifying indicia is associated with a printed copy of a document and which is further arranged to provide the identity of a document from a document identifying indicia.

19. A system according to claim 18 in which said document registry server is provided by one of: said document store; a server on a network; a computer to which said indicia reader is capable of connecting; said indicia reader.

20. A system according to claim 17 which comprises indicia modifying means capable of changing document identifying indicia and arranged to change said document identifying indicia in said electronic copy of said document when compared to said document identifying indicia on said document.

21. A system according to claim 17 in which said indicia reader is arranged to read a pattern that can be identified by a portion of the pattern wherein the portion of the pattern is a position identifying pattern.

22. A system according to claim 17 comprising a printer capable of printing a document and arranged to print a copy of said electronic document supplied thereby.

23. A system according to claim 22 wherein the printed copy is of higher quality than said document.

24. A system according to claim 17 in which the document identifying indicia exists in an area of location encoded pattern, wherein the area of location encoded pattern covers the entirety of the document.

25. A method of providing an electronic copy of at least a portion of a document comprising providing at least one document identifying indicia, capable of identifying at least a portion of said document, on said document the method further comprising the following steps:

i. providing an indicia reader arranged to read said at least one indicia on said document;

ii. providing an indicia data generator arranged to receive data indicia reader and generate indicia data representative of said indicia;

iii. reading said indicia with said indicia reader, providing said indicia data to said indicia data generator, and generating indicia data representative of said indicia with said indicia data generator;

iv. providing a document identifier arranged to identify at least a portion of said document from said indicia data;

v. identifying at least a portion of said document with said document identifier;

vi. providing a document retriever arranged to receive the identity of at least a portion of said document from said document identifier and to obtain at least a portion of an electronic copy of a document; and vii. obtaining an electronic copy of said document and/or portions thereof identified using said document retriever, wherein said indicia reader is cabable of allowing a user to modify indicia data on said document.

26. A system arranged to provide an electronic copy of at least a portion of a document, said system comprising an indicia reader, a document store and a document identifier, said indicia reader being capable of reading data, generating data and of connection to said document identifier, and being arranged to read document identifying indicia from a document and generate indicia data representative of said indicia, said system further comprising a document identifier capable of receiving and processing data, said document identifier being arranged to receive said indicia data and to process said indicia data to identify said document and said document store being capable of storing data and of supplying identified data and being arranged to supply at least a portion of an electronic copy of said document identified by said document identifier, wherein said indicia reader is capable of allowing a user to modify indicia data from said document.

* * * * *